(12) United States Patent
Bruna Estrach

(10) Patent No.: US 9,042,680 B2
(45) Date of Patent: May 26, 2015

(54) TEMPORAL VIDEO INTERPOLATION METHOD WITH 2-FRAME OCCLUSION HANDLING

(75) Inventor: Joan Bruna Estrach, Paris (FR)

(73) Assignee: ZORAN (FRANCE) S.A., Neuilly-sur-Seine (FR)

(*) Notice: Subject to any disclaimer, the term of this patent is extended or adjusted under 35 U.S.C. 154(b) by 346 days.

(21) Appl. No.: 13/148,798

(22) PCT Filed: Jan. 22, 2010

(86) PCT No.: PCT/EP2010/050744
§ 371 (c)(1),
(2), (4) Date: Aug. 10, 2011

(87) PCT Pub. No.: WO2010/091937
PCT Pub. Date: Aug. 19, 2010

(65) Prior Publication Data
US 2011/0311163 A1   Dec. 22, 2011

Related U.S. Application Data

(60) Provisional application No. 61/152,121, filed on Feb. 12, 2009.

(51) Int. Cl.
G06K 9/32 (2006.01)
G06T 3/40 (2006.01)
H04N 7/01 (2006.01)

(52) U.S. Cl.
CPC ............ *G06T 3/4007* (2013.01); *H04N 7/0127* (2013.01); *H04N 7/014* (2013.01)

(58) Field of Classification Search
None
See application file for complete search history.

(56) References Cited

U.S. PATENT DOCUMENTS 4,727,422 A * 2/1988 Hinman .................. 375/240.12
4,890,160 A   12/1989 Thomas
(Continued)

FOREIGN PATENT DOCUMENTS

EP   1734767 A1   12/2006
EP   1855474 A1   11/2007
(Continued)

OTHER PUBLICATIONS

International Search Report dated Apr. 27, 2010 from corresponding Application No. PCT/EP2010/050744.
(Continued)

*Primary Examiner* — Tsung-Yin Tsai
(74) *Attorney, Agent, or Firm* — Vorys, Sater, Seymour and Pease LLP; Vincent M. DeLuca

(57) ABSTRACT

A direction of regularity, which minimizes a directional energy computed from pixel values of consecutive first and second frames of an input video sequence, is respectively associated with each pixel of the first frame and with each pixel of the second frame. Another direction of regularity ($v_z$), which minimizes a directional energy computed from pixel values of the first and second frames, is also associated with an output pixel (z) of a frame of an output video sequence, located in time between the first and second frames. For processing such output pixel, the respective minimized directional energies for the output pixel, at least one pixel (z') of the first frame and at least one pixel (z") of the second frame are compared to control an interpolation performed to determine a value of the output pixel. The interpolation uses pixel values from at least one of the first and second frames of the input video sequence depending on the comparison of the minimized directional energies.

6 Claims, 8 Drawing Sheets

(56) References Cited

U.S. PATENT DOCUMENTS

| | | | |
|---|---|---|---|
| 5,151,784 A * | 9/1992 | Lavagetto et al. | 375/240.12 |
| 5,661,525 A * | 8/1997 | Kovacevic et al. | 348/452 |
| 5,784,114 A * | 7/1998 | Borer et al. | 348/452 |
| 6,625,333 B1 * | 9/2003 | Wang et al. | 382/300 |
| 6,744,931 B2 * | 6/2004 | Komiya et al. | 382/284 |
| 7,010,039 B2 | 3/2006 | De Haan et al. | |
| 7,343,044 B2 * | 3/2008 | Baba et al. | 382/236 |
| 7,899,122 B2 * | 3/2011 | Ohwaki et al. | 375/240.16 |
| 7,983,339 B2 * | 7/2011 | Francois et al. | 375/240.15 |
| 8,224,126 B2 * | 7/2012 | Sartor et al. | 382/300 |
| 2002/0171759 A1 * | 11/2002 | Handjojo et al. | 348/452 |
| 2003/0142748 A1 * | 7/2003 | Tourapis et al. | 375/240.13 |
| 2004/0091046 A1 * | 5/2004 | Akimoto et al. | 375/240.12 |
| 2005/0157792 A1 * | 7/2005 | Baba et al. | 375/240.16 |
| 2005/0212974 A1 * | 9/2005 | Michel et al. | 348/699 |
| 2006/0193535 A1 * | 8/2006 | Mishima et al. | 382/294 |
| 2006/0222077 A1 * | 10/2006 | Ohwaki et al. | 375/240.16 |
| 2008/0231745 A1 * | 9/2008 | Ogino et al. | 348/441 |
| 2009/0245694 A1 * | 10/2009 | Sartor et al. | 382/300 |
| 2011/0096227 A1 * | 4/2011 | Bruna Estrach | 348/441 |
| 2011/0310304 A1 | 12/2011 | Bruna Estrach | |
| 2012/0243611 A1 * | 9/2012 | Kondo | 375/240.16 |

FOREIGN PATENT DOCUMENTS

| | | | | |
|---|---|---|---|---|
| WO | 9922520 | A2 | 5/1999 | |
| WO | 2004039074 | A1 | 5/2004 | |
| WO | WO 2005004479 | A1 * | 1/2005 | H04N 7/01 |
| WO | 2005022922 | A1 | 3/2005 | |
| WO | 2005027525 | A1 | 3/2005 | |
| WO | 2009053780 | A2 | 4/2009 | |
| WO | 2009087493 | A1 | 7/2009 | |
| WO | 2010091930 | A2 | 8/2010 | |
| WO | 2010091934 | A1 | 8/2010 | |

OTHER PUBLICATIONS

Silveira et al., "Variable Block Sized Motion Segmentation for Video Coding," 1997 IEEE International Symposium on Circuits and System, Jun. 9-12, 1997, Hong Kong, pp. 1293-1296.

Mertens et al., "Motion vector field improvement for picture rate conversion with reduced halo," Proc. SPIE, 2001, vol. 4310, pp. 352-362.

Braspenning et al., "Efficient Motion Estimation with Content-Adaptive Resolution," Sep. 23, 2002, pp. E29-E34.

Kim et al., "Motion-adaptive alternate gamma drive for flicker-free motion-blur reduction in 100/120-Hz LCD TV," Journal of the SID, 2009, vol. 17/3, pp. 203-212.

International Preliminary Report on Patentability and Written Opinion dated Aug. 16, 2011 for Application No. PCT/EP2010/050744.

* cited by examiner

TEMPORAL VIDEO INTERPOLATION METHOD WITH 2-FRAME OCCLUSION HANDLING

BACKGROUND OF THE INVENTION

The present invention relates to interpolation methods used in digital video processing such as frame-rate conversion.

In digital systems, a video sequence is typically represented as an array of pixel values $I_t(x)$ where t is an integer time index, and x is a 2-dimensional integer index $(x_1, x_2)$ representing the position of a pixel in the image. The pixel values can for example be single numbers (e.g. gray scale values), or triplets representing color coordinates in a color space (such as RGB, YUV, YCbCr, etc.).

Temporal video interpolation is commonly performed using motion detection, or more generally detection of directions of regularity, in a sequence of input video frames. A popular technique for motion detection is referred to as "block matching". In the case where an object is moving at a given speed in the video sequence, the best directional interpolation is well defined and corresponds to the speed of the object. This works well when the objects are visible in both reference frames at times t and t+1. In the case of an occlusion or a disocclusion, some pixels belonging to an object are visible in one of the two reference frames only. There is therefore no unambiguous direction of regularity. If, however, the algorithm applies a directional interpolation in this region, artifacts such as ghosting or halo are inevitable.

A one-sided directional interpolation can be used to reduce these artifacts. Still it is necessary to determine the proper motion, knowing that only one of the two reference frames provides the right pixel information, and which reference frame will provide the pixel values to be copied.

In U.S. Pat. Nos. 4,890,160 and 7,010,039, it has been proposed to detect beforehand obscured areas (occlusions) and uncovered areas (disocclusions). For interpolation, picture information in uncovered areas is taken from the following picture in the input sequence, while information in obscured areas comes from the preceding picture. However, the preliminary detection of occlusion/disocclusion areas requires information from a number of consecutive input frames. This has a negative impact in terms of line buffer size requirement in the video processing device. Also, the occlusion/disocclusion detection can have a significant computational cost.

There is thus a need for a method in which the interpolation parameters can be determined with limited complexity.

SUMMARY OF THE INVENTION

A video interpolation method as proposed herein comprises:
receiving pixel values of consecutive first and second frames of an input video sequence;
performing a first optimization to associate with pixels of the first frame respective directions of regularity which minimize a directional energy computed from pixel values of the first and second frames;
performing a second optimization to associate with pixels of the second frame respective directions of regularity which minimize a directional energy computed from pixel values of the first and second frames;
and for an output pixel of a frame of an output video sequence located in time between the first and second frames:
performing a third optimization to associate with the output pixel a direction of regularity which minimizes a directional energy computed from pixel values of the first and second frames;
determining respective first and second pixels in the first and second frames of the input video sequence, in alignment with the output pixel along the direction of regularity associated with the output pixel;
comparing results of the first optimization for the first pixel, the second optimization for the second pixel and the third optimization for the output pixel; and
depending on the comparison, determining a pixel value for the output pixel.

Remarkably, occlusions and disocclusions are dealt with using pixels only from two consecutive frames of the input video sequence. They can be decided as and when the output pixels are processed, by comparing directional energies and/or directions of regularity determined for the current output frame and for the two consecutive input frames located before and after the current output frame. The interpolation is made very efficiently with limited internal buffer requirements. This has a strong impact in terms of component cost reduction.

In an embodiment of the method where the comparison of results of the first, second and third optimizations bears on the minimized directional energies, the determination of a pixel value for an output pixel comprises:
if none of the minimized directional energies for the first and second pixels fulfills a first comparison criterion with respect to the minimized directional energy for the output pixel, interpolating at the output pixel based on the direction of regularity associated with the output pixel using pixel values from both the first and second frames of the input video sequence;
if the minimized directional energy for the first pixel fulfills the first comparison criterion with respect to the minimized directional energy for the output pixel and a second comparison criterion with respect to the minimized directional energy for the second pixel, determining the pixel value for the output pixel using at least one pixel value from the second frame of the input video sequence; and
if the minimized directional energy for the second pixel fulfills the first comparison criterion with respect to the minimized directional energy for the output pixel and the second comparison criterion with respect to the minimized directional energy for the first pixel, determining the pixel value for the output pixel using at least one pixel value from the first frame of the input video sequence.

An occlusion typically occurs at an output pixel where the minimal directional energy for the "second pixel", projected onto the second frame, is much lower than the minimal directional energies determined for both the output pixel and the "first pixel", projected onto the first frame. In this case, the interpolation uses pixels of the first frame which includes the object being occluded. The interpolation will be based on a direction of regularity belonging to the object in the second image, i.e. a direction corresponding to a speed of the object being occluded. Conveniently, this can be the direction of regularity associated with the second pixel. For example, the pixel value for the output pixel is taken as a value of a pixel of the first frame aligned with the output pixel along the direction of regularity associated with the second pixel.

Likewise, a disocclusion typically occurs at an output pixel where the minimal directional energy for the "first pixel", projected onto the first frame, is much lower than the minimal directional energies determined for both the output pixel and the "second pixel", projected onto the second frame. In this case, the interpolation uses pixels of the second frame which includes the object being uncovered. The interpolation will be based on a direction of regularity belonging to the object in the first image, such as the direction of regularity associated with the first pixel. For example, the pixel value for the output pixel is taken as a value of a pixel of the second frame aligned with the output pixel along the direction of regularity associated with the first pixel.

In this embodiment, a number X may be said to fulfill one of the "comparison criteria" with respect to another number Y when X is markedly larger than Y. The extent meant by "markedly" here may depend on the application, the ranges for the pixel values, etc. Examples will be given further below. In addition, "markedly" can encompass different relative magnitude levels in the first and second comparison criteria. However, it is convenient to use first and second comparison criteria which are the same.

If the minimized directional energies for the first and second pixels both fulfill the first comparison criterion with respect to the minimized directional energy for the output pixel, the determination of a pixel value for the output pixel can use at least one pixel value from the first frame of the input video sequence if the minimized directional energy for the second pixel is smaller than the minimized directional energy for the first pixel, and at least one pixel value from the second frame of the input video sequence if the minimized directional energy for the first pixel is smaller than the minimized directional energy for the second pixel. In particular, it is possible to take for the output pixel a value of a pixel of one of the first and second frames aligned with the output pixel along the direction of regularity associated with the output pixel.

The output pixels of the frame of the output video sequence are typically processed in a raster order using a first buffer containing values of input pixels from the first and second frames of the input video sequence and a second buffer for containing the directions of regularity and the minimized directional energies respectively associated with said input pixels from the first and second frames. The comparison of results of the first, second and third optimizations for an output pixel then comprises reading from the second buffer the directions of regularity and/or the minimized directional energies respectively associated with the first and second pixels. The determination of a pixel value for the output pixel comprises reading at least one pixel value from the first buffer.

Prior to the comparison of results of the first, second and third optimizations for an output pixel, new values of the directions of regularity and of the minimized directional energies respectively associated with two input pixels can be computed and stored in the second buffer, the two input pixels having respective pixel positions in the first and second frames depending on a position of the output pixel being processed and on maximum vertical and horizontal magnitudes for the directions of regularity.

According to another feature, the first and second optimizations can be performed with a lower accuracy than the third optimization. An option for this is to use, in the first and second optimizations, pixel values from the first and second frames of the input video sequence represented more coarsely than pixel values from the first and second frames used in the third optimization.

Another aspect of the invention relates to a video interpolation device, comprising:
a first optimizer for associating with pixels of a first frame of an input video sequence respective directions of regularity which minimize a directional energy computed from pixel values of the first frame and pixel values of a second frame following the first frame in the input video sequence;
a second optimizer for associating with pixels of the second frame respective directions of regularity which minimize a directional energy computed from pixel values of the first and second frames;
a third optimizer for associating with an output pixel of a frame of an output video sequence located in time between the first and second frames a direction of regularity which minimizes a directional energy computed from pixel values of the first and second frames;
projection logic for determining respective first and second pixels in the first and second frames of the input video sequence, in alignment with the output pixel along the direction of regularity associated with the output pixel;
a comparator for comparing outputs of the first optimizer for said first pixel, of the second optimizer for said second pixel and of the third optimizer for said output pixel; and
an interpolator controlled by the comparator to determine a pixel value for the output pixel.

BRIEF DESCRIPTION THE DRAWINGS

DESCRIPTION OF PREFERRED EMBODIMENTS

Figure 1:
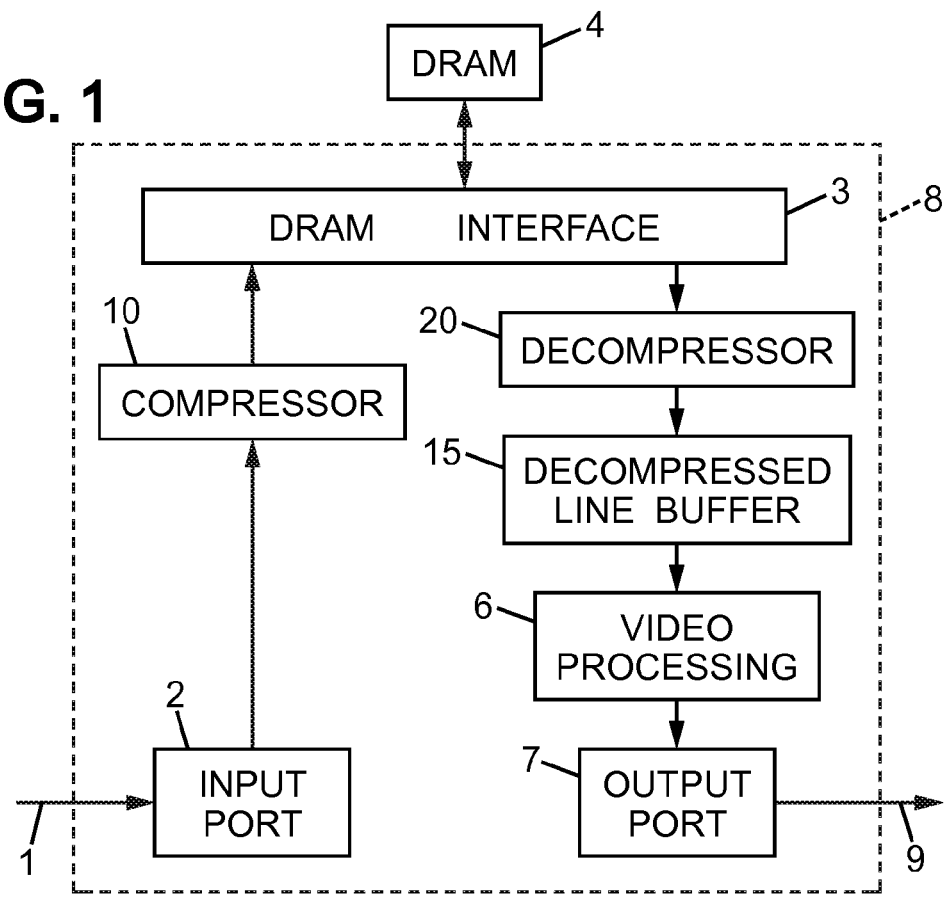
FIG. 1 is a block diagram of a video processing device capable of implementing the invention.

FIG. 1 shows an exemplary architecture of a video processing device 8 usable to implement the invention. The input pixels 1 received at an input port 2 are stored into a frame buffer 4, usually implemented as one or more dynamic random access memory (DRAM) chips, via a DRAM interface 3. The input frames can be compressed by a compressor 10 provided in the device 8 between the input port 2 and the DRAM interface 3. Then, a decompressor 20 fetches lines of the stored frames from the DRAM 4 through the DRAM interface 3, storing them temporarily in a line buffer 5. A video processor 6 has access to the line buffer 5 and applies the processing required by the application which, in the present case, involves interpolation between consecutive frames of the video stream. The output 9 of processor 6 is fed to the output port 7 to be transmitted to the next device to which the video processing device 8 is connected. All image transfers are done in raster order, i.e. each frame full line by full line, and each line of a frame pixel by pixel from left to right. Compression and decompression are a way of reducing both the required size of the internal memory and the bandwidth to the external DRAM chip(s). The compression and decompression scheme applied by compressor 10 and compressor 20 is for example as described in WO 2009/053780 or in co-pending international patent application No. PCT/EP2010/050722.

The video processor 6 performs interpolation between frames of the input video sequence using the block matching technique. The method proposed here makes it possible to determine an interpolated output frame at a time $t+\Delta$ ($0<\Delta<1$) based on consecutive input frames at times $t$ and $t+1$. In the application to frame rate conversion, the processor 6 operates at the rate of the output sequence. If an output frame is aligned in time with one of the input frames, it is simply determined as a copy of that input frame. An output frame located in time at $t+\Delta$ ($0<\Delta<1$) is determined using the interpolation between two consecutive input frames at $t$ and $t+1$.

In the block matching technique as used here, estimating the motion at a pixel $x=(x_1, x_2)$ and at time $t+\alpha$ ($0\leq\alpha\leq 1$) consists in identifying the motion vector or direction of regularity $v=(v_1, v_2)$ which minimizes a matching energy $E_{x,t+\alpha}(v)$ over a spatial window W which is a set of offsets $d=(d_1, d_2)$. A possible form of the matching energy ($L_1$-energy) is $$E_{x,t+\alpha}(v) = \sum_{d \in W} |I_t(x+d-\alpha \cdot v) - I_{t+1}(x+d+(1-\alpha) \cdot v)|.$$

Another possible form is the $L_2$-energy or Euclidean distance:

$$E_{x,t+\alpha}(v) = \sum_{d \in W} |I_t(x+d-\alpha \cdot v) - I_{t+1}(x+d+(1-\alpha) \cdot v)|^2.$$

In the optimization process, the directions of regularity $v=(v_1, v_2)$ can be selected from a limited set $\Omega$ of candidate directions in order to reduce the computation load. A suitable way of determining this set of candidate directions $\Omega$ is described in WO 2009/087493. The method described in co-pending international patent application No. PCT/EP2010/050734 can also be used.

Figure 2:
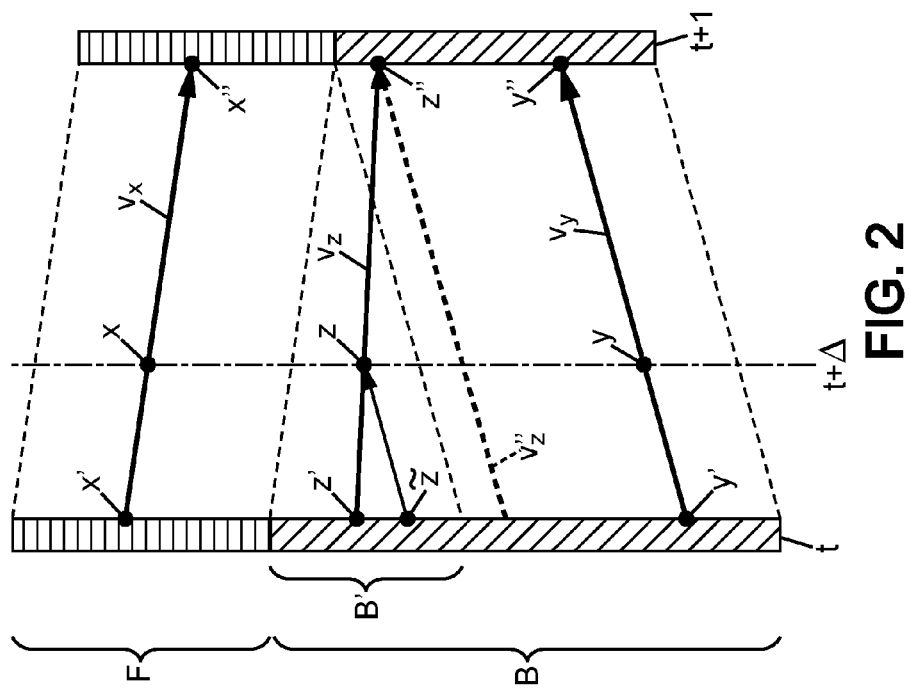
FIG. 2 is a diagram illustrating the principle of occlusion handling in the method disclosed herein.

In FIG. 2, a frame at time $t$ or $t+1$ is represented spatially as one-dimensional (vertical) in order to make the diagram more easily legible. However, the same considerations apply to the two-dimensional case. The figure shows a foreground object F and a background object B of which a portion B', visible in the frame at time $t$, becomes occluded by the foreground object F in the frame at time $t+1$ due to the relative speeds of the two objects B, F in the input video sequence.

For certain pixels of the intermediate frame to be interpolated at time $t+\Delta$, such as pixels x and y shown in FIG. 2 which are visible in both the first frame at time $t$ and the second frame at time $t+1$, the motion detection is not ambiguous. It gives a clear winner $v_x$, $v_y$ at time $t+\Delta$ which, in most cases, is also (i) the best direction of regularity at time $t$ for the first pixel position $x'=x-\Delta \cdot v_x$, $y'=y-\Delta \cdot v_y$ projected from x, y onto the first frame along $v_x$, $v_y$ and (ii) the best direction of regularity at time $t+1$ for the second pixel position $x''=x+(1-\Delta) \cdot v_x$, $y''=y+(1-\Delta) \cdot v_y$ projected from x, y onto the second frame along $v_x$, $v_y$. The minimal directional energy $E_x$, $E_y$ determined at time $t+\Delta$ for the output pixel position x, y, the minimal directional energy $E'_{x'}$, $E'_{y'}$ determined at time $t$ for the first pixel position $x'$, $y'$ and the minimal directional energy $E''_{x''}$, $E''_{y''}$ determined at time $t$ for the second pixel position $x''$, $y''$ are then identical or relatively close to each other.

The interpolation at pixel x, y and time $t+\Delta$ can then be performed using pixels from both the first and second frames, for example linearly:

$$I_{t+\Delta}(x) = (1-\Delta) \cdot I_t(x') + \Delta \cdot I_{t+1}(x''), I_{t+\Delta}(y) = (1-\Delta) \cdot I_t(y') + \Delta \cdot I_{t+1}(y'').$$

However, some pixels z of the intermediate frame at time $t+\Delta$ belong to the occluded portion B' and are thus visible in the first frame at time $t$ but not in the second frame at time $t+1$. The direction of regularity $v_z$ is determined for such a pixel z as minimizing the directional energy $E_{z,t+\Delta}(v)$, namely $$v_z = \underset{v \in \Omega}{\mathrm{Argmin}}(E_{z,t+\Delta}(v)) \text{ with } E_z = \underset{v \in \Omega}{\mathrm{Min}}(E_{z,t+\Delta}(v)).$$

In the occlusion case, the direction $v_z$ is not reliable. It points to a first pixel z' in the first frame at time $t$ and to a second pixel z'' in the second frame at time $t+1$.

In the present interpolation method, the minimal directional energies $$E'_{z'} = \underset{v \in \Omega}{\mathrm{Min}}(E_{z',t}(v)) \text{ and } E''_{z''} = \underset{v \in \Omega}{\mathrm{Min}}(E_{z'',t+1}(v))$$

at pixels z' and z'' of the first and second frames, and the associated directions of regularity $$v'_{z'} = \underset{v \in \Omega}{\mathrm{Argmin}}(E_{z',t}(v)) \text{ and } v''_{z''} = \underset{v \in \Omega}{\mathrm{Argmin}}(E_{z'',t+1}(v))$$

are available when processing the output pixel z. In that processing, the relative magnitudes of $E_z$, $E'_{z'}$ and $E''_{z''}$ are compared. The occlusion case typically occurs where $E''_{z''}$ is markedly lower than both $E_z$ and $E'_{z'}$. Indeed, pixel z' generally belongs to portion B' when $E''_{z''} \ll E_z$ and $E'_{z'}$. Like pixel z, it does not have an unambiguous counterpart in the second frame at time $t+1$ while pixel z'' has a much higher probability to belong to a part of the background object which appears in both the first and second frames. This criterion can be used to decide on the fly that pixel z pertains to an occluded area. When that decision is made (occlusion), one-sided interpolation is performed for example as follows:

one or more pixels of the first frame at time $t$ are used;
  a direction of regularity relating to the background object, such as the direction of regularity $v''_{z''}$ associated with the second projected pixel z'', is selected for spatial interpolation.

A simple possibility is to copy at $(z, t+\Delta)$ the pixel value at $(\tilde{z}, t)$ with $\tilde{z} = z - \Delta \cdot v''_{z''}$ as illustrated in FIG. 2: $I_{t+\Delta}(z) = I_t(\tilde{z})$.

Figure 3:
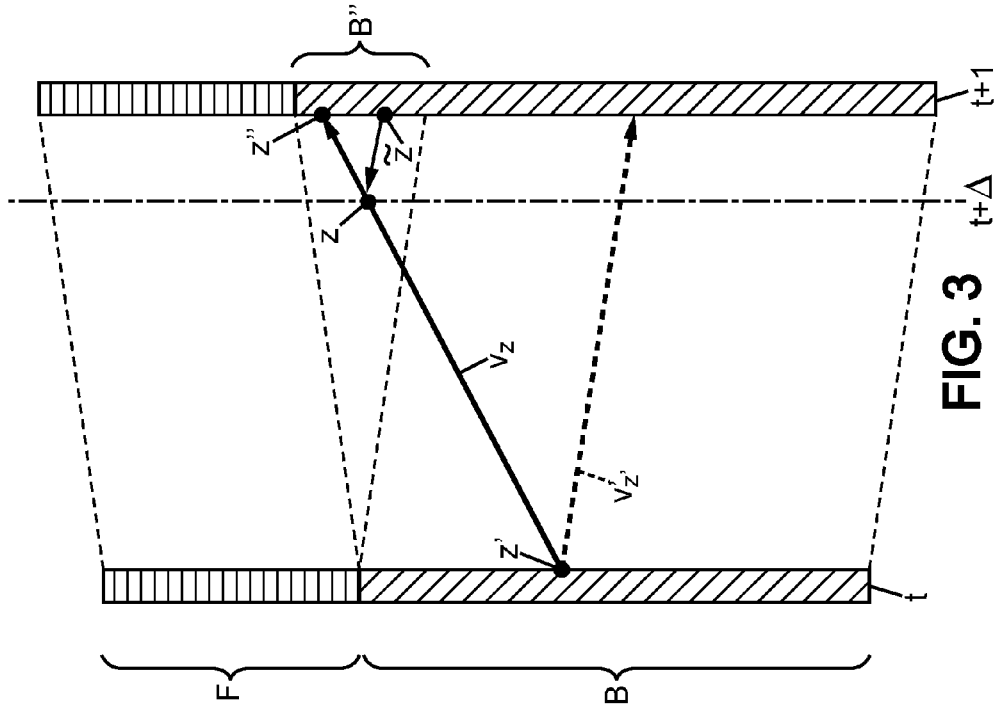
FIG. 3 is a diagram similar to FIG. 2 illustrating the case of a disocclusion.

Symmetrically, FIG. 3 illustrates the case of a disocclusion, in which a pixel z of the intermediate frame at time $t+\Delta$ belongs to the uncovered portion B'' and is thus visible in the second frame at time $t+1$ but not in the first frame at time $t$. Again, the direction $v_z$ is not reliable. The comparison of the minimal directional energies $E_z$, $E'_{z'}$ and $E''_{z''}$ will generally reveal that $E'_{z'}$ is markedly lower than both $E_z$ and $E''_{z''}$. Indeed, pixel z' will generally belong to portion B'' when $E'_{z'} \ll E_z$ and $E''_{z''}$. Like pixel z, it does not have an unambiguous counterpart in the first frame at time $t$ while pixel z' has a much higher probability to belong to a part of the background object which appears in both the first and second frames. The comparison criterion is used to decide on the fly that pixel z pertains to an uncovered area. When that decision is made (disocclusion), one-sided interpolation is performed for example as follows:
one or more pixels of the second frame at time t+1 are used;
a direction of regularity relating to the background object, such as the direction of regularity $v'_{z'}$ associated with the first projected pixel z', is selected for spatial interpolation.

A simple possibility is to copy at (z, t+Δ) the pixel value at (z̃, t+1) with z̃=z+(1−Δ)·$v'_{z'}$, as illustrated in FIG. 3: $I_{t+\Delta}(z)=I_{t+1}(\tilde{z})$.

It can happen that the comparison done when processing the output pixel z shows that both $E'_{z'}$ and $E''_{z''}$ are markedly lower than $E_z$. There are then three possibilities:
- $E''_{z''} \ll E'_{z'}$ and we are in an occlusion case treated as discussed with reference to FIG. 2;
- $E'_{z'} \ll E''_{z''}$ and we are in a disocclusion case treated as discussed with reference to FIG. 3;
- $E'_{z'}$ and $E''_{z''}$ are of the same order of magnitude, meaning that the occlusion/disocclusion situation is complex.

The latter situation is much less frequent than a regular occlusion or disocclusion case. If it occurs, the comparison between $E'_{z'}$ and $E''_{z''}$ is used to decide which of the first and second frames will provide the pixel(s) for the one-sided interpolation of frame t+Δ. Namely if $E''_{z''}<E'_{z'}$, one or more pixels are copied from the first frame at t, while $E'_{z'}<E''_{z''}$, one or more pixels are copied from the second frame at t+1. This one-sided interpolation can be performed based on the direction of regularity $v_z$ determined for pixel z at time t+Δ, i.e. $I_{t+\Delta}(z)=I_t(z')$ if $E''_{z''}<E'_{z'}$ and $I_{t+\Delta}(z)=I_{t+1}(z'')$ if $E'_{z'}<E''_{z''}$.

Figure 4:
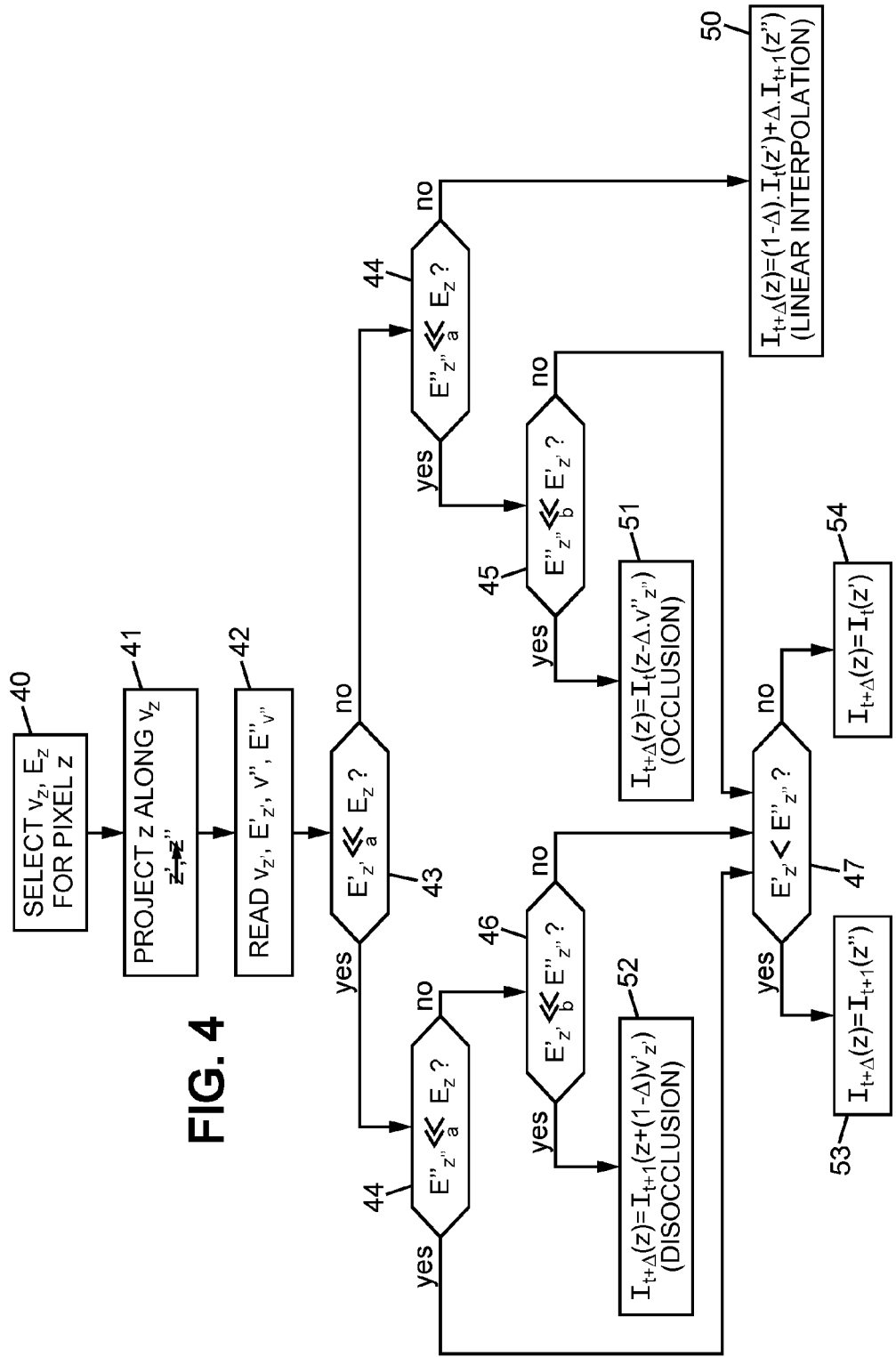
FIG. 4 is a flow chart of an exemplary interpolation procedure handling occlusion/disocclusion situations.

FIG. 4 illustrates a possible procedure applicable to determine a pixel z when processing a frame corresponding to time t+Δ (0<Δ<1). It is assumed here that the directions of regularity and minimal directional energies for the pixels of the relevant spatial ranges in the preceding and following frames of the input video sequence have been determined beforehand and stored in a buffer. The first step 40 consists in selecting the direction of regularity $v_z$ for the current pixel z and the corresponding minimal directional energy $E_z$ by an optimization procedure as mentioned above. Then (step 41), a projection of pixel z on the first and second frames at times t and t+1 is performed to locate the first and second pixels z' and z", i.e. z'=z−Δ·$v_z$ and z"=z+(1−Δ)·$v_z$. The directions of regularity $v'_{z'}$, $v''_{z''}$ and minimal directional energies $E'_{z'}$, $E''_{z''}$ for the first and second pixels are read from the buffer in step 42 prior to performing comparisons between the three minimal directional energies $E_z$, $E'_{z'}$ and $E''_{z''}$.

In the embodiment of FIG. 4, the comparisons are made in steps noted 43-47. First, in step 43 and 44, the read minimal directional energies $E'_{z'}$, $E''_{z''}$ for the first and second pixels are compared with the minimal directional energy $E_z$ for the current output pixel, as determined in step 40, using a comparison criterion noted $$\underset{a}{\ll}$$

in the figure.

If none of $E'_{z'}$ and $E''_{z''}$ fulfills that comparison criterion $$\underset{a}{\ll}$$

with respect to $$E_z \left( E'_{z'} \underset{a}{\not\ll} E_z \text{ and } E''_{z''} \underset{a}{\not\ll} E_z \right),$$

linear interpolation is performed in step 50 to calculate pixel z as mentioned above:

$$I_{t+\Delta}(z)=(1-\Delta) \cdot I_t(z')+\Delta \cdot I_{t+1}(z'').$$

Otherwise, another comparison is performed between the minimal directional energies $E'_{z'}$, $E''_{z''}$ for the first and second pixels in step 45, 46 or 47.

If $E'_{z'} \underset{a}{\not\ll} E_z$ and $E''_{z''} \underset{a}{\ll} E_z$, test 45 is applied to check whether $$E''_{z''} \underset{b}{\ll} E'_{z'},$$

where $$\underset{b}{\ll}$$

denotes another comparison criterion which may be the same as or different from the first criterion $$\underset{a}{\ll}$$

If test 45 is positive, it is decided that there is an occlusion at pixel z in frame t+Δ (FIG. 2) and one-sided interpolation from the first frame is applied in step 51:

$$I_{t+\Delta}(z)=I_t(z-\Delta \cdot v''_{z''}).$$

If $$E'_{z'} \underset{a}{\ll} E_z \text{ and } E''_{z''} \underset{a}{\not\ll} E_z,$$

test 46 is applied to check whether $$E'_{z'} \underset{b}{\ll} E''_{z''}.$$

If test 46 is positive, it is decided that there is a disocclusion at pixel z in frame t+Δ (FIG. 3) and one-sided interpolation from the second frame is applied in step 52:

$$I_{t+\Delta}(z)=I_{t+1}(z+(1-\Delta) \cdot v'_{z'}).$$

If tests 43-44 show that $$E'_{z'} \underset{a}{\ll} E_z \text{ and } E''_{z''} \underset{a}{\ll} E_z,$$

or if one of tests 45 and 46 is negative, the occlusion/disocclusion situation is complex as mentioned above. Test 47 is then applied to determine the largest energy among $E'_{z'}$ and $E''_{z''}$. If $E_z < E_{z''}$, one-sided interpolation from the second frame is applied in step 53: $I_{t+\Delta}(z) = I_{t+1}(z'')$. If $E_{z''} < E_z$, one-sided interpolation from the first frame is applied in step 54:

$$I_{t+\Delta}(z) = I_t(z').$$

Possible expressions for the comparison criteria are $$X \underset{a}{<\!\!<} Y$$

if and only if $X \leq p_a \cdot Y + q_a$, and $$X \underset{b}{<\!\!<} Y$$

if and only if $X \leq p_b \cdot Y + q_b$ where $p_a$, $p_b$ are positive numbers and $q_a$, $q_b$ are positive or negative numbers. In particular, for simplicity, the comparison criteria $$"\underset{a}{<\!\!<}" \text{ and } "\underset{b}{<\!\!<}"$$

can be identical; in the above example, this gives $p_a = p_b = p$ (e.g. $p=3$) and $q_a = q_b = q$ whose magnitude is chosen based on the dynamic ranges for the pixel values.

Figure 5:
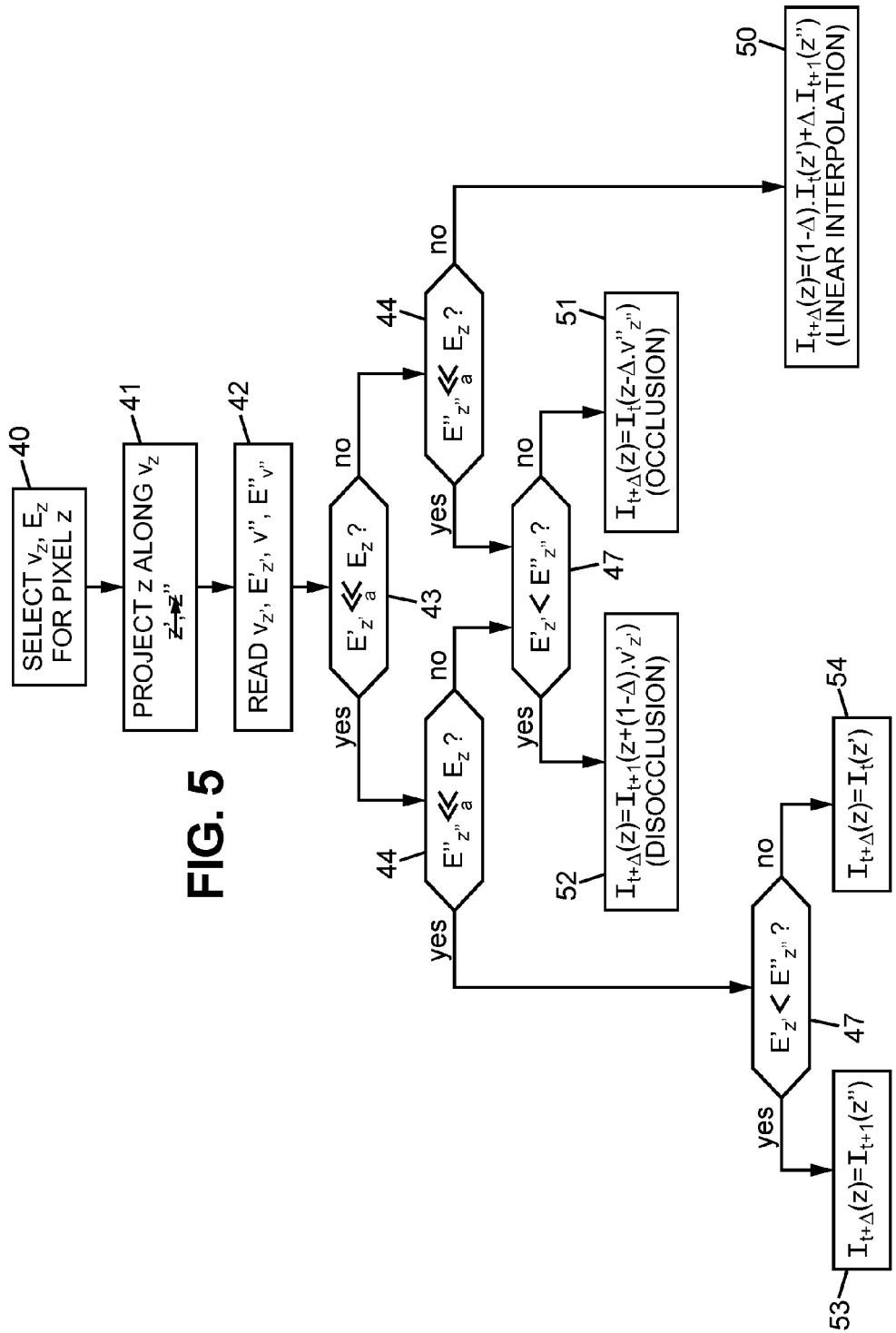
FIG. 5 is a flow chart of an alternative interpolation procedure handling occlusion/disocclusion situations.

In an embodiment, the second comparison criterion $$"\underset{b}{<\!\!<}"$$

is a simple inequality, i.e. $p_b = 1$ and $q_b = 0$. Tests 45, 46 and 47 are then the same and the procedure of FIG. 4 can be modified as shown in FIG. 5. In this case, when one (not both) of the minimal directional energies $E'_{z'}$, $E''_{z''}$ fulfills the criterion $$"\underset{a}{<\!\!<}"$$

in steps 43-44, test 47 is performed to determine the largest energy among $E'_{z'}$ and $E''_{z''}$. If $E_{z'} < E_{z''}$, the occlusion-type of one-sided interpolation is applied in step 51. Otherwise, the disocclusion-type of one-sided interpolation is applied in step 52. The remainder of the procedure is the same as in FIG. 4.

Alternatively, the comparisons made to decide whether linear interpolation is suitable, or whether one-sided interpolation should be used instead, can involve the directions of regularity $v_z$, $v''_{z'}$ and $v''_{z''}$ determined for the pixels z, z' and z''. For example, a first test can be made to check whether $v_z = v'_{z'} = v''_{z''}$ (or $v_z \approx v'_{z'} \approx v''_{z''}$). If $v_z = v'_{z'} = v''_{z''}$, linear interpolation 50 can be selected. If not, the minimized directional energies $E_z$, $E'_{z'}$, $E''_{z''}$ are further compared to decide, along the lines indicated above, which of the input frames is better suited for one-sided interpolation.

Figure 6:
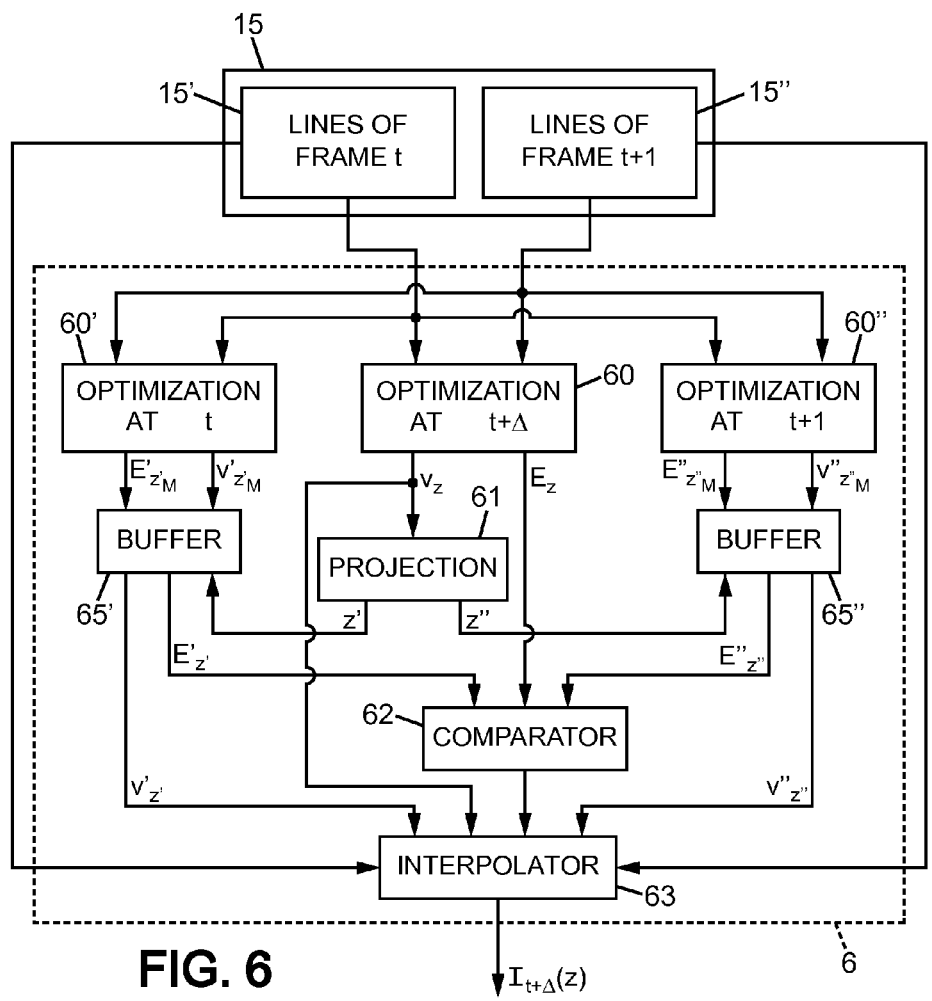
FIG. 6 is a block diagram of a video processor usable in an embodiment of the video interpolation device.

FIG. 6 illustrates a possible architecture of the video processor 6 of FIG. 1 for implementing the method described above. The frame buffer 15 is shown with two regions, one 15' containing lines of an input frame at time t and the other 15'' containing lines of the next input frame at time t+1. In the video processor 6, an optimizer module 60 carries out the minimization step 40 for the current pixel z of the intermediate frame to be interpolated at time $t+\Delta$ to determine $v_z$ and $E_z$. A projection module 61 carries out the projection step 41 of FIG. 4 or 5 to determine the first and second pixels z', z'' based on the pixel position z and the direction of regularity $v_z$. A comparator 62 is in charge of the comparison steps 43-47 described with reference to FIG. 4 or 5 in order to control the interpolator 63 which applies the interpolation step 50-54 depending on the comparison criteria.

FIG. 6 also shows the buffer parts 65', 65'' which contain the directions of regularity v', v'' and minimal directional energies E', E'' for the pixels of the frames at times t and t+1, respectively, which may be selected as first and second pixels z', z'' by the projection module 61 depending on the direction of regularity which is going to be selected by the optimizer module 60. The directions of regularity v', v'' and minimal directional energies E', E'' are calculated in advance by optimizer modules 60', 60'' based on the contents of the line buffer 15.

Figure 7:
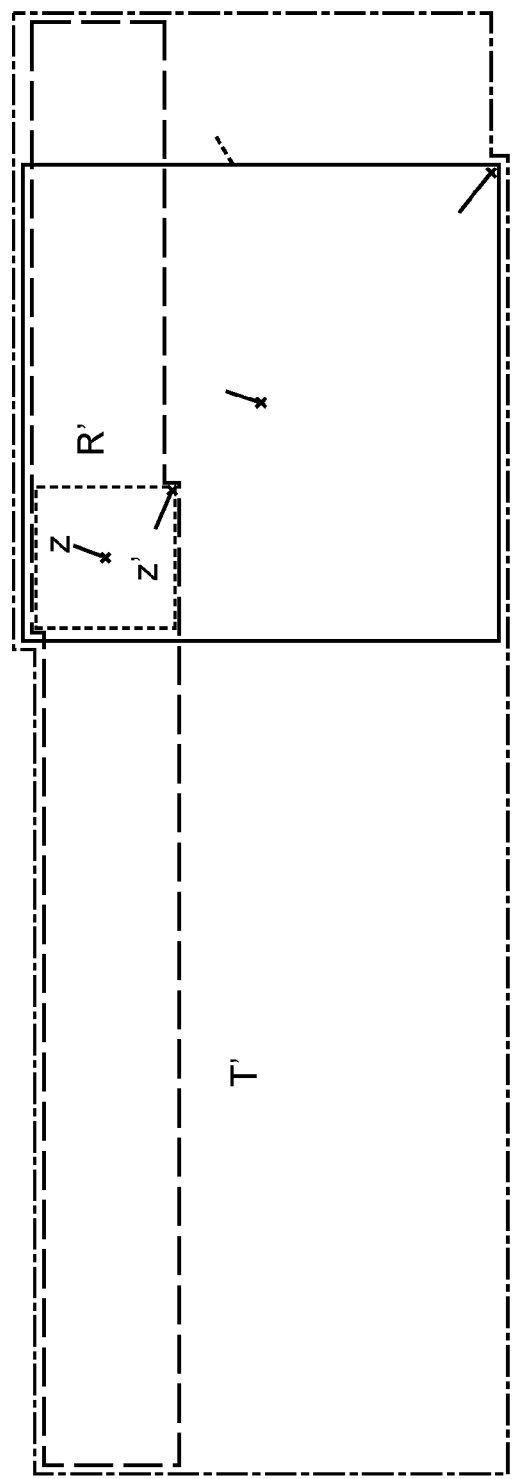
FIGS. 7 and 8 are diagrams illustrating the contents of buffers used by the video processor of FIG. 6.
Figure 8:
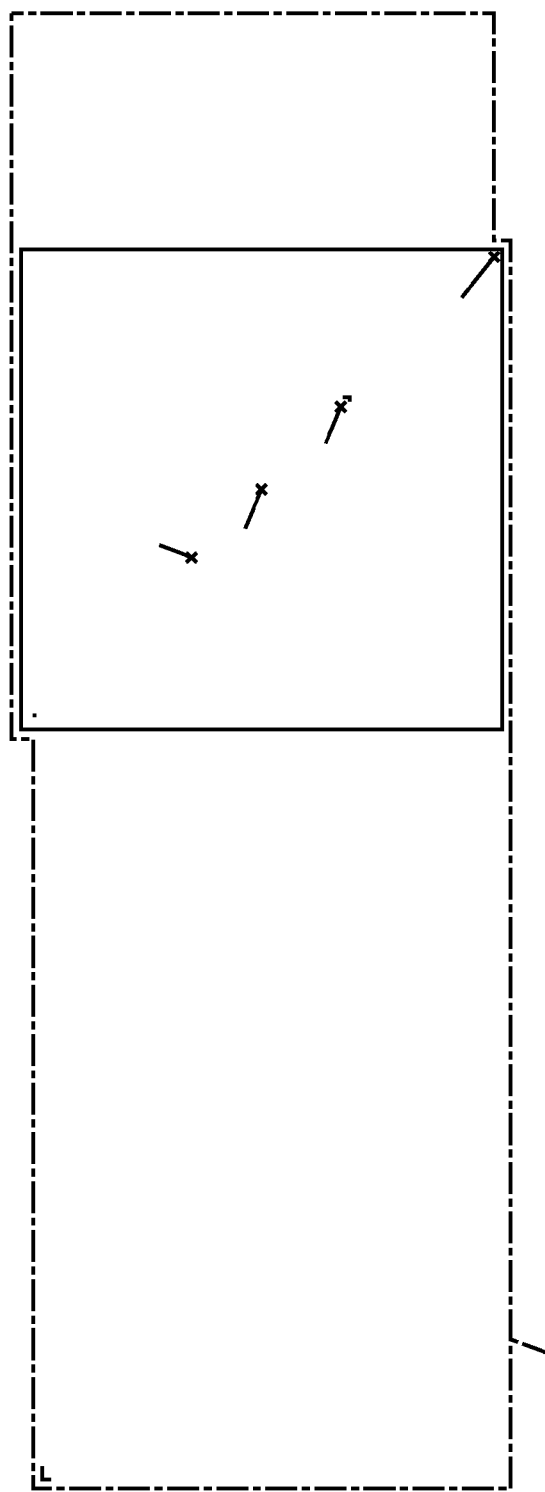

The pixels of the output video sequence at time $t+\Delta$ are typically processed in the raster order. FIG. 7 for the first frame and 8 for the second frame illustrate the required contents of the buffer parts 15', 15'', 65', 65'' of FIG. 6 when an output pixel z is processed. Before the procedure steps illustrated in FIG. 4 or 5, we must make sure that all the relevant directions v', v'' and energies E', E'' are stored in buffers 65', 65''. This includes:

calculating the direction of regularity $v'_{z'_M}$ and the associated minimal energy $E'_{z'_M}$ for a new pixel $z'_M$ of the first frame indicated in FIGS. 7 and 8, and storing them in buffer 65'. Pixel $z'_M$ is located at $z+\Delta \cdot v_M$ in the first frame, where $v_M = (v_{M1}, v_{M2})$ is a vector whose horizontal and vertical components are the maximum horizontal and vertical magnitudes for the directions of regularity. The buffer 65' is managed to contain at least the directions of regularity and minimal directional energies for all the pixels $z+\delta'$ of a rectangular region R' of the first frame such that $\delta' = (\delta'_1, \delta'_2)$, $-\Delta \cdot v_{M1} \leq \delta'_1 \leq +\Delta \cdot v_{M1}$ and $-\Delta \cdot v_{M2} \leq \delta'_2 \leq \Delta \cdot v_{M2}$;

calculating the direction of regularity $v''_{z''_M}$ and the associated minimal energy $E''_{z''_M}$ for a new pixel $z''_M$ of the second frame, and storing them in buffer 65''. Pixel $z''_M$ is located at $z+(1-\Delta) \cdot v_M$ in the second frame. The buffer 65'' contains at least the directions of regularity and minimal directional energies for all the pixels $z+\delta''$ of a rectangular region R'' of the second frame such that $\delta'' = (\delta''_1, \delta''_2)$, $-(1-\Delta) \cdot v_{M1} \leq \delta''_1 \leq +(1-\Delta) \cdot v_{M1}$ and $-(1-\Delta) \cdot v_{M2} \leq \delta''_2 \leq +(1-\Delta) \cdot v_{M2}$.

The pixel values of regions R' (time t) and R'' (time t+1) must be made available to the interpolator module 63 in buffers 15' and 15'' in order to perform interpolation based on the direction of regularity $v'_{z'}$, $v''_{z''}$ or $v_z$ which will be selected.

In FIG. 8, the rectangular region S'' contains the pixels of the second frame at t+1 to which the optimizer module 65' must have access to calculate $v'_{z'_M}$ and $E'_{z'_M}$ for the new pixel $z'_M$ of the first frame. Region S'' contains all the pixels $z'_M + \delta''$ of the second frame such that $\delta'' = (\delta''_1, \delta''_2)$, $-v_{M1} \leq \delta''_1 \leq +v_{M1}$ and $-v_{M2} \leq \delta''_2 \leq +v_{M2}$ and an additional margin to take into account the size of the spatial window W used to compute the matching energies $E_{x,t}(v)$. It is noted that $R'' \subset S''$. Likewise, the rectangular region S' of FIG. 7 contains the pixels of the first frame at t to which the optimizer module 65'' must have access to calculate $v''_{z''_M}$ and $E''_{z''_M}$ for the new pixel $z''_M$ of the second frame. Region S' has the same size as region S''. It contains all the pixels $z''_M + \delta'$ of the first frame such that $\delta' = (\delta'_1, \delta'_2)$, $-v_{M1} \leq \delta'_1 \leq +v_{M1}$ and $-v_{M2} \leq \delta'_2 \leq +v_{M2}$ and an additional margin to take into account the size of the spatial window W. It is noted that R'∈S'.

Since the pixels are processed in the raster order, the contents of the buffers can be arranged as horizontal stripes of lines extending over the width of the frames. This is indicated by boxes T', U' in FIG. 7 and T", U" in FIG. 8. Boxes T' and T" delimit the contents of buffers 65' and 65", respectively. Box T' (resp. T") includes all the pixels of the first (resp. second) frame which are in the rectangular region R' (resp. R") plus pixels of n'−1 lines (resp. n"−1 lines) between R' (resp. R") and the left edge of the first (resp. second) frame and pixels of n'−1 lines (resp. n"−1 lines) between R' (resp. R") and the right edge of the first (resp. second) frame, where n' (resp. n") is the number of lines in region R' (resp. R"). Boxes U' and U" delimit the contents of buffers 15' and 15", respectively. Box U' (resp. U") includes all the pixels of the first (resp. second) frame which are in the rectangular region S' (resp. S") plus pixels of N−1 lines between S' (resp. S") and the left edge of the first (resp. second) frame and pixels of N−1 lines between S' (resp. S") and the right edge of the first (resp. second) frame, where N is the number of lines in regions S' and S".

Before processing the output pixel z, the bottom right pixel w', w" of regions S', S" of the first and second frames are loaded in line buffer parts 15', 15" to be included in the pixels regions U', U" stored in those buffer parts 15', 15". The pixels of regions S', S" are then available to the optimization modules 60", 60' for calculating the new directions of regularity at times t+1 and t, respectively. After this calculation, these directions of regularity $v'_{z'_M}$, $v''_{z''_M}$ and associated minimal directional energies $E'_{z'_M}$, $E''_{z''_M}$ are written into the buffers 65', 65" to be used, with the other values in R', R", by the comparator 62 and interpolator 63. The buffers 65', 65" can be controlled to store the direction and energy values for regions T', T" indicated in FIGS. 7-8.

Various modifications can be made to the examples which have been described above.

Figure 9:
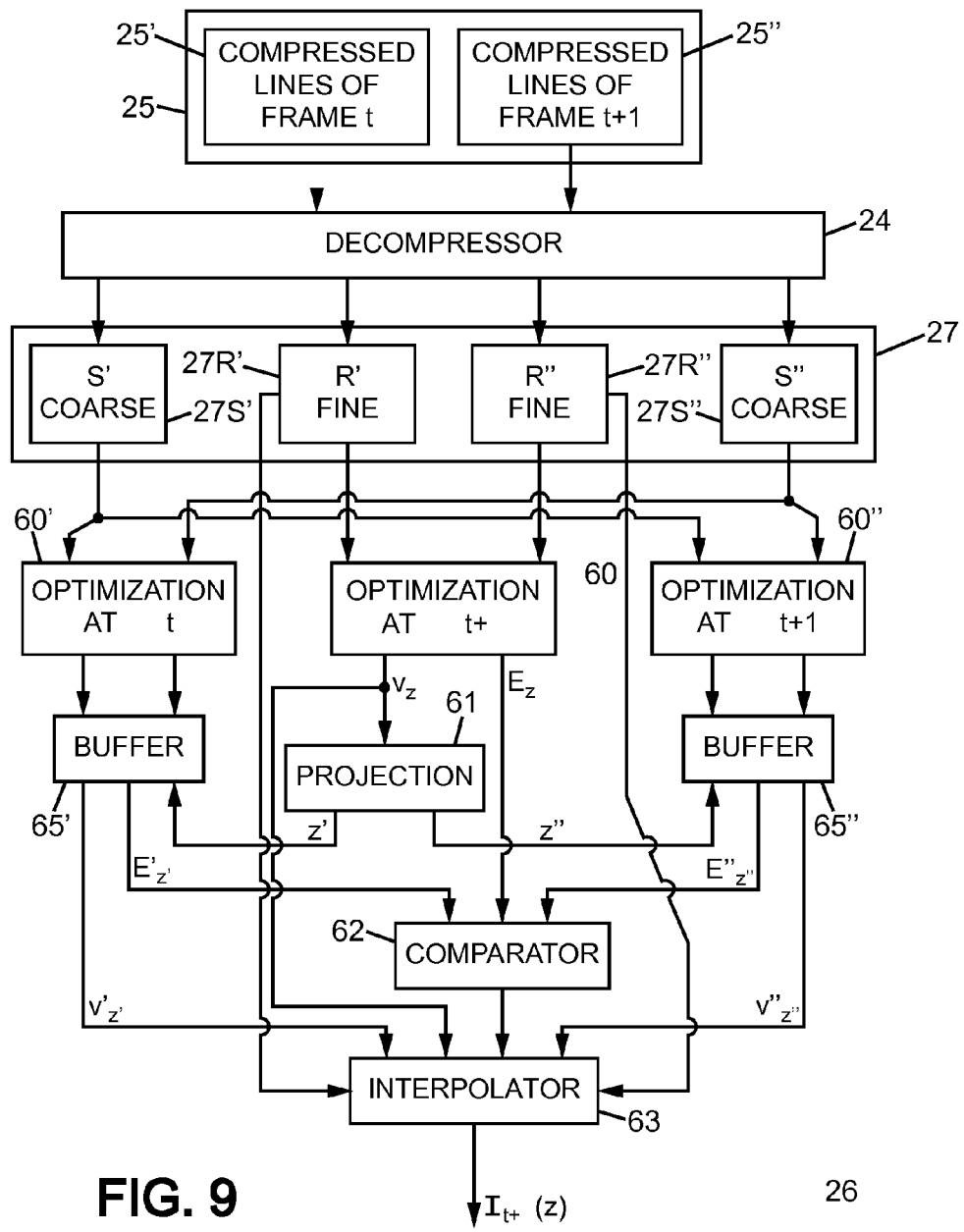
FIG. 9 is a block diagram of an alternative embodiment of the video processor.

For example, in the embodiment shown in FIG. 9, the line buffer 25 contains compressed pixel lines of the input frames at times t and t+1 (25' for frame t, 25" for frame t+1). In other words, there is no decompressor between the DRAM interface 3 (FIG. 1) and the line buffer 25. Instead, the decompressor 24 is located between the compressed line buffer 25 and a context buffer 27 of the video processor 26. The context buffer 27 has a part 27R' for containing the decompressed pixels of region R' in the input frame at time t, a part 27R" for containing the decompressed pixels of region R" in the input frame at time t+1, a part 27S' for containing the decompressed pixels of region S' (or S'-R') in the input frame at time t, and a part 27S" for containing the decompressed pixels of region S" (or S"-R") in the input frame at time t+1 (FIGS. 7-8).

The decompressor 24 can operate at different resolution scales for representing the pixel values. In the example of FIG. 9, fine resolution pixel values of regions R' and R" are stored in context buffer parts 27R' and 27R" to be used by the optimizer 60 at time t+Δ and the interpolator 63. Pixel values of coarser resolution from regions S' and S" (or S'-R' and S"-R") are stored in context buffer parts 27S' and 27S" to be used by the optimizers 60' and 60" at time t and t+1. This makes it possible to reduce the computational complexity in optimizers 60', 60" and the buffer size requirement.

While a detailed description of exemplary embodiments of the invention has been given above, various alternative, modifications, and equivalents will be apparent to those skilled in the art. Therefore the above description should not be taken as limiting the scope of the invention which is defined by the appended claims.

The invention claimed is:

1. A video interpolation method, comprising:
   receiving pixel values of consecutive first and second frames of an input video sequence;
   performing a first optimization to associate with pixels of the first frame respective directions of regularity which minimize a directional energy computed from pixel values of the first and second frames;
   performing a second optimization to associate with pixels of the second frame respective directions of regularity which minimize a directional energy computed from pixel values of the first and second frames;
   and for an output pixel of a frame of an output video sequence located in time between the first and second frames:
   performing a third optimization to associate with the output pixel a direction of regularity which minimizes a directional energy computed from pixel values of the first and second frames;
   determining respective first and second pixels in the first and second frames of the input video sequence, in alignment with the output pixel along the direction of regularity associated with the output pixel;
   comparing results of the first optimization for said first pixel, the second optimization for said second pixel and the third optimization for said output pixel; and
   depending on the comparison, determining a pixel value for the output pixel;
   wherein the comparison of results of the first, second and third optimizations comprises comparing the respective minimized directional energies for the output pixel, the first pixel and the second pixel;
   if none of the minimized directional energies for the first and second pixels fulfills a first comparison criterion with respect to the minimized directional energy for the output pixel, interpolating at the output pixel based on the direction of regularity associated with the output pixel using pixel values from both the first and second frames of the input video sequence;
   if the minimized directional energy for the first pixel fulfills the first comparison criterion with respect to the minimized directional energy for the output pixel and a second comparison criterion with respect to the minimized directional energy for the second pixel, determining the pixel value for the output pixel using at least one pixel value from the second frame of the input video sequence; and
   if the minimized directional energy for the second pixel fulfills the first comparison criterion with respect to the minimized directional energy for the output pixel and the second comparison criterion with respect to the minimized directional energy for the first pixel, determining the pixel value for the output pixel using at least one pixel value from the first frame of the input video sequence.

2. The method as claimed in claim 1, wherein, if the minimized directional energy for the first pixel fulfills the first comparison criterion with respect to the minimized directional energy for the output pixel and the second comparison criterion with respect to the minimized directional energy for the second pixel, the pixel value for the output pixel is taken as a value of a pixel of the second frame aligned with the output pixel along the direction of regularity associated with the first pixel, and wherein, if the minimized directional energy for the second pixel fulfills the first comparison criterion with respect to the minimized directional energy for the output pixel and the second comparison criterion with respect to the minimized directional energy for the first pixel, the pixel value for the output pixel is taken as a value of a pixel of the first frame aligned with the output pixel along the direction of regularity associated with the second pixel.

3. The method as claimed in claim 1, wherein the determination of a pixel value for the output pixel further comprises:
if the minimized directional energies for the first and second pixels both fulfill the first comparison criterion with respect to the minimized directional energy for the output pixel, determining the pixel value for the output pixel using at least one pixel value from the first frame of the input video sequence if the minimized directional energy for the second pixel is smaller than the minimized directional energy for the first pixel and using at least one pixel value from the second frame of the input video sequence if the minimized directional energy for the first pixel is smaller than the minimized directional energy for the second pixel.

4. The method as claimed in claim 3, wherein, if the minimized directional energies for the first and second pixels both fulfill the first comparison criterion with respect to the minimized directional energy for the output pixel, the pixel value for the output pixel is taken as a value of a pixel of one of the first and second frames aligned with the output pixel along the direction of regularity associated with the output pixel.

5. A video interpolation device, comprising:
a first optimizer for associating with pixels of a first frame of an input video sequence respective directions of regularity which minimize a directional energy computed from pixel values of the first frame and pixel values of a second frame following the first frame in the input video sequence;
a second optimizer for associating with pixels of the second frame respective directions of regularity which minimize a directional energy computed from pixel values of the first and second frames;
a third optimizer for associating with an output pixel of a frame of an output video sequence located in time between the first and second frames a direction of regularity which minimizes a directional energy computed from pixel values of the first and second frames;
projection logic for determining respective first and second pixels in the first and second frames of the input video sequence, in alignment with the output pixel along the direction of regularity associated with the output pixel;
a comparator for comparing outputs of the first optimizer for said first pixel, of the second optimizer for said second pixel and of the third optimizer for said output pixel; and
an interpolator controlled by the comparator to determine a pixel value for the output pixel;
wherein the comparator is arranged to compare the respective minimized directional energies for the output pixel, the first pixel and the second pixel;
to perform interpolation at the output pixel based on the direction of regularity associated with the output pixel using pixel values from both the first and second frames of the input video sequence if none of the minimized directional energies for the first and second pixels fulfills a first comparison criterion with respect to the minimized directional energy for the output pixel;
to determine the pixel value for the output pixel using at least one pixel value from the second frame of the input video sequence if the minimized directional energy for the first pixel fulfills the first comparison criterion with respect to the minimized directional energy for the output pixel and a second comparison criterion with respect to the minimized directional energy for the second pixel; and
to determine the pixel value for the output pixel using at least one pixel value from the first frame of the input video sequence if the minimized directional energy for the second pixel fulfills the first comparison criterion with respect to the minimized directional energy for the output pixel and the second comparison criterion with respect to the minimized directional energy for the first pixel.

6. The device as claimed in claim 5, wherein the interpolator is arranged to take the pixel value for the output pixel as a value of a pixel of the second frame aligned with the output pixel along the direction of regularity associated with the first pixel if the minimized directional energy for the first pixel fulfills the first comparison criterion with respect to the minimized directional energy for the output pixel and the second comparison criterion with respect to the minimized directional energy for the second pixel,
and wherein the interpolator is further arranged to take the pixel value for the output pixel as a value of a pixel of the first frame aligned with the output pixel along the direction of regularity associated with the second pixel if the minimized directional energy for the second pixel fulfills the first comparison criterion with respect to the minimized directional energy for the output pixel and the second comparison criterion with respect to the minimized directional energy for the first pixel.

* * * * *